United States Patent
Bellwood et al.

(10) Patent No.: US 6,401,132 B1
(45) Date of Patent: Jun. 4, 2002

(54) SUBCHAINING TRANSCODERS IN A TRANSCODING FRAMEWORK

(75) Inventors: Thomas Alexander Bellwood; Christian Lita, both of Austin; Matthew Francis Rutkowski, Pflugerville; Michael John Walker, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/366,402

(22) Filed: Aug. 3, 1999

(51) Int. Cl.⁷ .............................. G06F 13/00
(52) U.S. Cl. ...................... 709/246; 709/201
(58) Field of Search ................. 709/200, 201, 709/203, 217, 218, 219, 221, 223, 236, 247, 246

(56) References Cited

U.S. PATENT DOCUMENTS

| | | | |
|---|---|---|---|
| 4,866,445 A | 9/1989 | Valero et al. ............... 341/106 |
| 5,537,440 A | 7/1996 | Eyboglu et al. ............ 375/245 |
| 5,675,508 A | 10/1997 | Kapadia ................. 364/514 B |
| 5,764,298 A | 6/1998 | Morrison .................... 348/500 |
| 6,073,168 A | * 6/2000 | Mighdoll et al. ........... 709/217 |
| 6,088,803 A | * 6/2000 | Tso et al. ................... 713/201 |
| 6,101,328 A | * 8/2000 | Bakshi et al. .............. 395/712 |
| 6,237,031 B1 | * 5/2001 | Knauerhase et al. ........ 709/221 |
| 6,247,048 B1 | * 6/2001 | Greer et al. ................ 709/219 |
| 6,247,050 B1 | * 6/2001 | Tso et al. ................... 709/224 |
| 6,304,904 B1 | * 10/2001 | Sathyanarayan et al. .... 709/224 |
| 6,308,222 B1 | * 10/2001 | Krueger et al. ............. 709/247 |
| 6,332,114 B1 | * 12/2001 | deVries et al. .............. 707/102 |

* cited by examiner

*Primary Examiner*—Moustafa M. Meky
(74) *Attorney, Agent, or Firm*—Jeffrey S. LaBaw; David H. Judson; Joseph R. Burwell

(57) ABSTRACT

A method for transcoding an input stream to a desired output format using a transcoder framework. In response to a given transcoder of the framework recognizing an external reference that it cannot transcode, the method calls a subseries of specialized transcoders to transcode the external reference. After the subseries of specialized transcoders generates a transcoded external reference, that reference is returned back to the given transcoder, where it is incorporated into the transcoder's output. Transcoder sub-chains are used in this manner as modular, building blocks in the transcoder framework.

24 Claims, 3 Drawing Sheets

SUBCHAINING TRANSCODERS IN A TRANSCODING FRAMEWORK

BACKGROUND OF THE INVENTION

1. Technical Field

The present invention relates generally to computer networks and, in particular, to a novel transcoding framework that includes one or more transcoder sub-chains.

2. Description of the Related Art

Intermediaries are computational entities that can be positioned anywhere along a data stream, e.g., an HTTP stream, and are programmed to tailor, customize, personalize, or otherwise distill or enhance data as it flows along the stream. A caching web proxy is a simple example of an HTTP intermediary. Intermediary-based programming is particularly useful for adding functionality to a system when the data producer (e.g., a server or database) or the data consumer (e.g., a browser) cannot be modified.

A known intermediary architecture and framework, called Web Intermediaries (or WBI, pronounced "webby"), is useful for creating intermediary applications on the web. Basically, WBI is a programmable web proxy and web server that, together with a web development kit, may be used with Java APIs for building web intermediary applications within the WBI framework. Examples of intermediary applications include: transcoding content between formats, personalization, password and privacy management, interactivity, and content filtering. WBI is just one example of an architecture for managing web intermediaries. Other conceptual techniques include, for example, chaining of Java servlets.

A transcoder is a functional module, typically in the form of a piece of computer code, that accepts a data stream as input and produces a data stream as output. The output stream is created based on the transcoder's input stream and the function that the transcoder is designed to perform. This function could be one of any number of operations such as: a monitoring activity for which information is collected before passing the input stream on as output, an editing operation where incoming data is modified in some way before it is output, or a data generation operation, where incoming data is treated as a request for more data available either inside or outside the system, which is then passed on as output from the transcoder. A given transcoder output stream may also be based upon an original or modified request, histographical information on transcoding paths already taken, and/or external preferences (e.g., network connection speed, client device capabilities, user preferences, and the like) established in a separate database. A given transcoder may have a proprietary interface to obtain these preferences, or it may use XSL style sheets to apply such preferences.

The use of streams to service the input and output needs of a transcoder is the implementation used by the WBI model. Transcoders, however, may also operate on data in a system organized, for example, according to a Document Object Model (DOM), via a reference to that model.

A set of "n" transcoders may be used together to provide more complex transcoding operations in a rule driven fashion. For example, as an input stream proceeds through the network, various transcoders may modify that stream, acquire data from an external source (e.g., an origin web server) and subsequently modify that data stream before returning the final output stream (the response). Such a framework works well when the operation to be performed is homogeneous and "flat" in nature.

If, however, the transcoding operations are hierarchical or require compound repetitive operations, the above-described functionality may be inefficient when performed monolithically. A monolithic operation is one that is performed in whole by a given transcoder. When hierarchical or compound repetitive operations are required, the use of monolithic transcoding operations has the effect of making some of the transcoders in the chain excessively complex. For example, a given transcoder may have to perform multiple operations to acquire, aggregate and post-process some external data prior to passing its output stream on to another transcoder.

The present invention addresses this problem.

BRIEF SUMMARY OF THE INVENTION

It is a primary object of the present invention to provide a transcoding framework that is modular. Preferably, a given transcoder in the framework need not be a monolithic implementation that contains all of the functionality needed to perform a complete task.

It is another primary object of the invention to provide a novel transcoding framework wherein sub-chained transcoders are used as modules to provide various reentrant transcoding functions that may be shared across the framework.

It is still another object of the present invention to sub-chain transcoders within the framework to flatten a non-homogeneous data stream possessing hierarchical components, thereby decreasing composition time and providing faster delivery of documents to the requester.

Still another object of this invention is to provide a transcoding framework that supports recursive use of given-sub-chained transcoders.

A still further object of this invention is to service a given request (e.g., HTTP, WML, FTP, or the like) using a transcoder in a chain that has the capability of creating subchains of known transcoders to assist in flattening a document comprised of multiple resources into a single format for the next transcoder in the chain (or the end requester if the end of the chain has been reached).

Another more general object of this invention is to enable a given transcoder in a chain to use a sub-chain of transcoders one or more times to assist in completing the given transcoder's operation as similar external resources are encountered. These subchains may be asked to process these resources in parallel and to notify the given transcoder when they have finished processed their assigned resource.

Yet another more general object of this invention is to provide a transcoding framework that takes advantage of subsets of transcoders as reusable components that can be used multiple times to retrieve external data parts while processing a particular request.

A further feature of the invention is the use of transcoder subchains in parallel for providing performance gains.

These and other objects and features are provided by a novel transcoding framework of the present invention. A given transcoder in the framework comprises a transcoding function (e.g., a generator, an editor, a monitor, or the like), a data structure for identifying one or more sub-chains of specialized transcoders that are available to the transcoder, and a control routine. In one embodiment, the routine is responsive to recognition of an external reference that cannot be transcoded by the transcoding function (a) for locating a sub-chain of specialized transcoders in the data structure, (b) for calling the sub-chain of specialized transcoders, (c) for receiving a transcoded external reference provided by the sub-chain of specialized transcoders, and (d) for incorporating the transcoded external reference in an output of the transcoder.

According to another feature of the present invention, a method is provided for transcoding an input stream to a desired output format using a transcoder framework. In response to a given transcoder of the framework recognizing an external reference that it cannot transcode, the method calls a subseries of specialized transcoders to transcode the external reference. After the subseries of specialized transcoders generates a transcoded external reference, that reference is returned back to the given transcoder, where it is incorporated into the transcoder's output. Transcoder sub-chains are used in this manner as modular, building blocks in the transcoder framework.

The foregoing has outlined some of the more pertinent objects and features of the present invention. These objects should be construed to be merely illustrative of some of the more prominent features and applications of the invention. Many other beneficial results can be obtained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
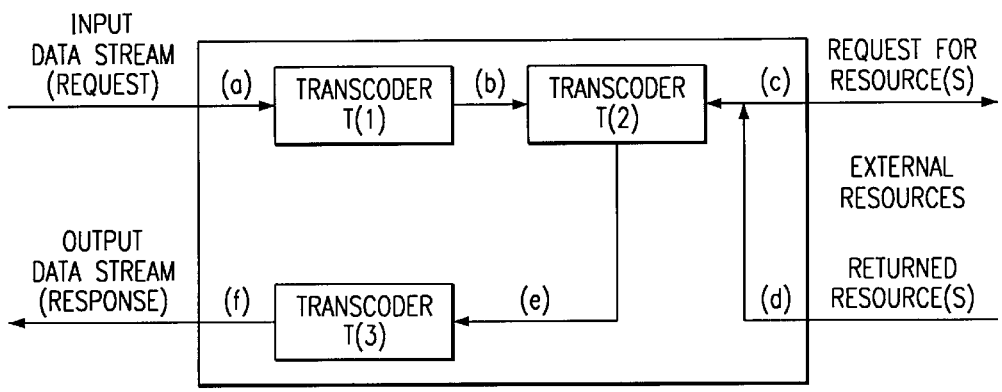
FIG. 1 is a simplified diagram of a transcoding framework comprising a set of transcoders that process an HTTP request from a client.

FIG. 1 illustrates a transcoding framework wherein a set of three transcoders are used to process a given request, e.g., an HTTP request. In this example, a client requests a web page hosted on a web server. Transcoder T(1) is used, for example, to modify the request so that the request can pass through a proxy. Transcoder T(2) is used to retrieve the requested page, and transcoder T(3) is used to edit the returned document (e.g., to delete an image, to remove given text, to inject an advertisement, or the like). The WBI framework may be used to implement this architecture. This diagram illustrates how the input stream (in this case, an HTTP request) might proceed through the network and how the various transcoders modify that stream, acquire data from an external source (e.g., an origin web server) and subsequently modify that data stream before returning the final output stream (the response).

As noted above, the above-illustrated framework may not be efficient if given transcoding operations are hierarchical or require compound repetitive operations. When hierarchical or compound repetitive operations are required, the use of monolithic transcoding operations has the effect of making some of the transcoders in the chain excessively complex. This would be the case, for example, if transcoder T(2) is a monolithic transcoder that must perform multiple operations to acquire, aggregate and post-process the external data it obtains prior to passing its output stream on to transcoder T(3).

Figure 2:
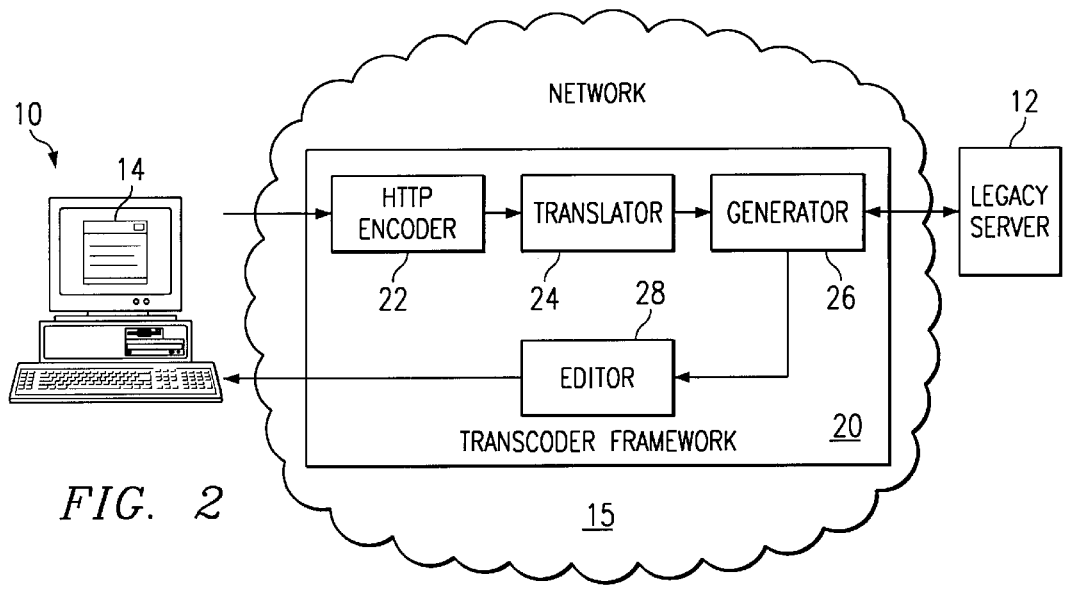
FIG. 2 illustrates a transcoding framework wherein a number of transcoding intermediaries are used to connect together a requesting process, such as a web browser, with a data source, such as a server.

FIG. 2 is a block diagram of another illustrative transcoding framework. For purposes of illustration only, it is assumed that Company A has given data on a legacy server 12 in a legacy format that it wishes to export, and that Company B wishes to access this data, for example, via a client machine 10 having a browser 14. Company A and B are interconnected via a network 15, which, in this example, includes the public Internet. Company A desires to convert the data into Extensible Markup Language (XML) format using a particular Document Template Definition (DTD) so that a user of the client machine 10 may issue an XML remote procedure call (RPC) (e.g., using the browser) to retrieve that data. If, the source DTD does not match the required DTD, then a translation also is required somewhere along the transmission path. A transcoding framework 20 that includes one or more transcoders may be used to facilitate this data exchange.

In particular, it is assumed that the user of the web browser 14 at Company B desires to access the data. The browser formulates the request for data as (1) a URL (including the name of the server that hosts the data and the path of the URL, e.g. http://myserver/mydata), and, optionally, (2) a description for the data (e.g. the DTD that it should be encoded in, e.g. http://myserver/myformat.dtd). The request for data may then be passed to a first transcoder 22. This operation may be done from Java or using the Java Native Interface from C code, or any other known approach. The transcoder 22 then expresses the request in HTTP, e.g., encoding the desired data format into HTTP headers using an HTTP extension mechanism.

It is not required for the browser to provide the transcoder 22 with the DTD needed for transcoding. The transcoder may be set up to transcode data of a certain type (and/or from specific providers or requesters, or classes of requesters, such as for clients using specific pervasive devices like a palmtop).

In this illustrative example, the output of the first transcoder 22 then is passed to the second transcoder 24. In particular, if the source and destination DTD formats do not match, the second transcoder 24 is used for translation purposes. Transcoder 24 receives the HTTP request, observes the source type and the desired type, and performs an appropriate translation.

The output of the second transcoder 24 then is provided to a third transcoder 26 located at or adjacent the legacy server. In this example, the third transcoder 26 serves as a dynamic web server. In particular, this transcoder listens for requests in HTTP or some other protocol and generates an appropriate response. In particular, when the request for the particular piece of data is received, transcoder 26 dynamically accesses the data from any resource available to the system, e.g., a local file system, a remote filesystem, a relational database, a remote web server, or the like. The transcoder 26 is a "generator" because it generates data in response to a request. In this example, transcoder 26 accesses the data from the legacy server 12. The data output from the third transcoder 26 may then be converted into XML using a fourth transcoder 28, which functions as an "editor." For example, if the data from a web server is HTML, the transcoder 28 scans the HTML and edits out the relevant information, converting the resulting stream into XML. The resulting XML stream is then provided back to the browser.

Thus, in this illustrative example, a number of transcoding intermediaries are used to connect together a requesting process (the browser) with a data source. The network protocol is HTTP, the serialized data format is an XML grammar, the translation is handled using standard XML conversion tools or ad hoc code. As a result, the requesting process either receives the XML stream or a pre-parsed object representing the data. Of course, the above example should not be taken to limit the applicability of the present invention. As will be seen, the invention is not limited to datastreams that can be expressed in XML grammar. Indeed, transcoders used within the inventive transcoding framework may be used with AFP, binary data, and other formats that are not XML-compliant.

In the above example, each transcoder operates in a monolithic fashion. While this technique has certain advantages, many transcoding operations are hierarchical in nature or require compound repetitive operations. It is quite inefficient to perform such operations in a monolithic transcoder, which would have to be excessively complex. The present invention addresses this problem by providing for so-called "sub-chains" of transcoders. As used herein, a "sub-chain" is a set of two or more transcoders and/or transcoder functions (e.g., a generator, an editor, a monitor, an analyzer, or the like) as a "modular" or building block in a larger framework. A given sub-chain is logically reusable within the framework by one or more transcoders. In servicing a request, a given transcoder in the framework is able to create and/or to use sub-chains of known transcoders, e.g., to assist in flattening a document (comprised of multiple resources) into a single format for a next transcoder in the chain or for the end requester if the end of chain has been reached.

Figure 3:
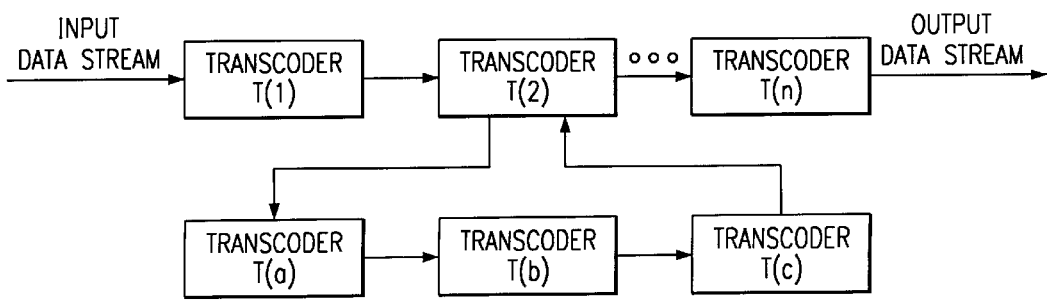
FIG. 3 is a diagram of an illustrative example of the preferred embodiment of the invention wherein a subsets of transcoders are used in a transcoder subchain.

The basic sub-chaining functionality of the present invention is illustrated in FIG. 3. As seen in this general case, transcoder T(2) includes sufficient intelligence to recognize that its input data stream (from transcoder T(1)) contains reference to external resources it can retrieve, but it is assumed that transcoder T(2) does not know how to transcode into a format it can work on. According to the present invention, T(2) utilizes a subchain of transcoders, such as transcoders T(a)–T(c), that transcode the data in the external resource into a format transcoder T(2) can handle. Furthermore, transcoder T(2) may use the transcoders T(a)–T(c) one or more times to assist in completing its transcoding operation as similar external resources are encountered within the request. According to the invention, these sub-chains may be asked to process such resources in parallel and to notify an owning transcoder when they have finished processing their assigned resource.

Figure 4:
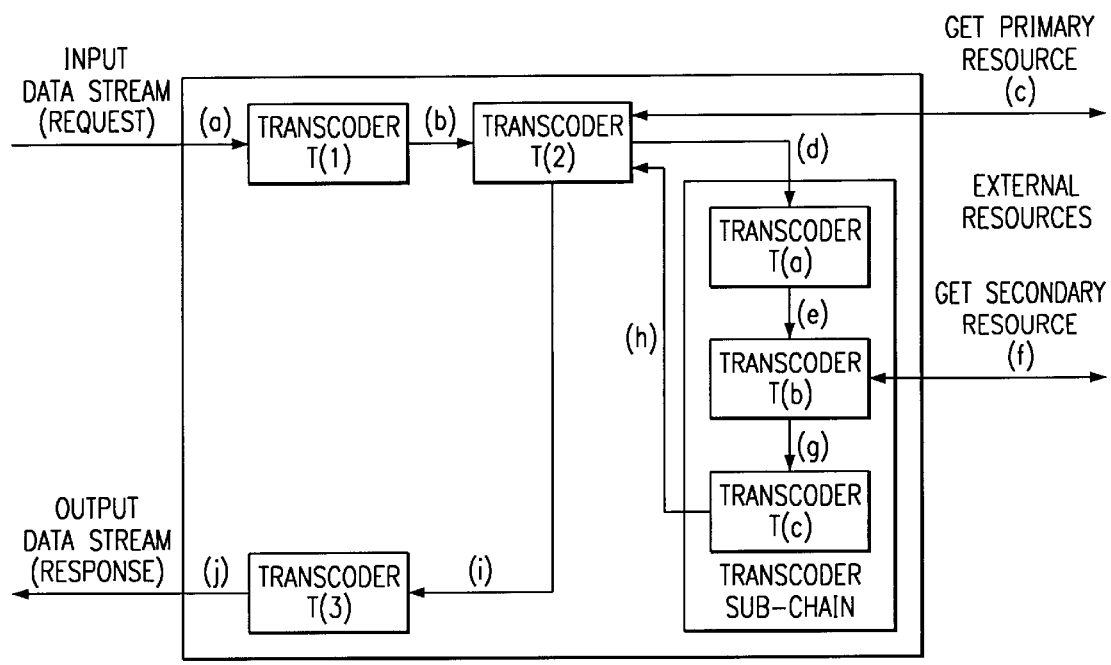
FIG. 4 is a block diagram of an illustrative embodiment of the invention wherein a subset of transcoders are available as reusable components.

According to a preferred embodiment of the invention, which is now described, it is desirable to take advantage of subsets of transcoders as reusable components that Can be utilized one or more times to retrieve external data parts while processing a particular request. FIG. 4 illustrates this embodiment in more detail.

The process flow illustrative in this diagram is intended to reflect the recursive nature of the inventive transcoding framework by tracing an incoming request as it is processed. Of course, this operation is merely illustrative. The input data stream (i.e. the request) is generated by a client application such as a browser. The request is provided at step (a) to transcoder T(1). For illustrative purposes, the input data stream is a request for a web page and transcoder T(1) serves to modify that request so that it can be processed by a proxy server. The output from transcoder T(1) is then supplied to transcoder T(2) at step (b). Upon reaching transcoder T(2), a request for resources external to the framework is made. In this example, the resource returned (step c) includes references to other resources that must be separately acquired, processed, and added into an overall data stream before passing the data stream on to the next transcoder, which in this case, is transcoder T(3). To accomplish this operation, transcoder T(2) repetitively uses a sub-chain of transcoders T(a), T(b) and T(c) to acquire the needed secondary resources. In particular, at step (d), the transcoder T(2) accesses the transcoder sub-chain. At step (e), transcoder T(a) accesses transcoder T(b). Transcoder T(b), in this example, obtains the secondary reference(s) at step (f) and then, at step (g), returns the resource(s) to transcoder T(c). When the sub-chain completes its processing, transcoder T(c) returns the results back to transcoder T(2) at step (h). Once all of the secondary references have been separately acquired, processed and added into the overall data stream, transcoder T(2) is able to continue servicing the original client request by passing the accumulated data on to transcoder T(3). This is step (i). Transcoder T(3) then provides whatever processing is required before returning the response back to the requesting client.

Thus, by comparing the frameworks illustrated in FIGS. 1 and 4, one of ordinary skill in the art will appreciate that the transcoder sub-chain provides significant advantages over the prior art. In particular, this sub-chain provides a modular set of functions (in this example, the acquiring and processing of certain secondary resources required by a primary resource) so that the resulting data stream may then be processed further or otherwise provided to back to the requesting client. With the present invention, no transcoder in the framework is required to be a monolithic implementation (e.g., transcoder T(2) in FIG. 1) that contains all of the functionality needed to perform a complete task. In particular, the use of sub-chained transcoders enables a given transcoder to take a non-homogeneous data stream possessing hierarchical components and to "flatten" that stream into a simple request and response format. This greatly simplifies the development of individual transcoders, decreases composition time, and provides faster delivery of documents to the requester.

As described above, prior art transcoding schemes use a "monolithic" strategy wherein a given transcoder must be able to obtain and convert all of the data formats contained within a document. On the contrary, the present invention enables a given transcoder to call upon and use an existing transcoder sub-chain that, for example, has the capability of flattening a non-homogeneous data stream into a number of simplified operations.

FIG. 4 illustrates how a transcoder sub-chain may be statically configured into the transcoder framework. According to the present invention, a given transcoder in the framework may include data and a control routine to enable that transcoder to dynamically identify, locate and then "own" a transcoder sub-chain. As used herein, a transcoder owns a sub-chain when it identifies and makes a request for the sub-chain to carry out a given modular operation for the transcoder.

According to the invention, ownership of a given sub-chain need not be exclusive (although it may be). In particular, given transcoder sub-chains may be used simultaneously by more than one "owning" transcoder. In such case, the transcoder sub-chain is owned non-exclusively. By enabling sub-chains to be shared, sub-chained calls may be made in parallel for performance gains within the transcoding framework.

Figure 5:
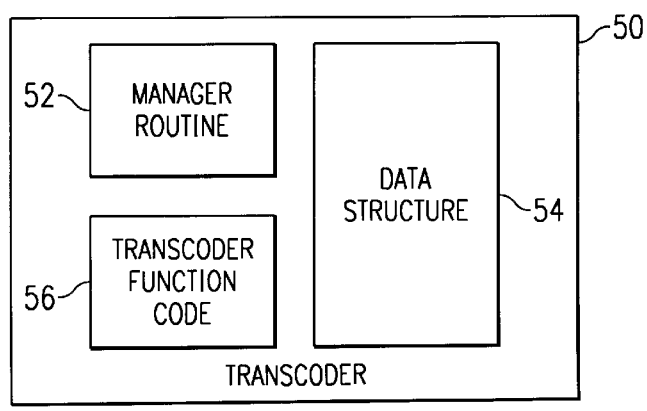
FIG. 5 is a simplified representation of a transcoder.
Figure 6:
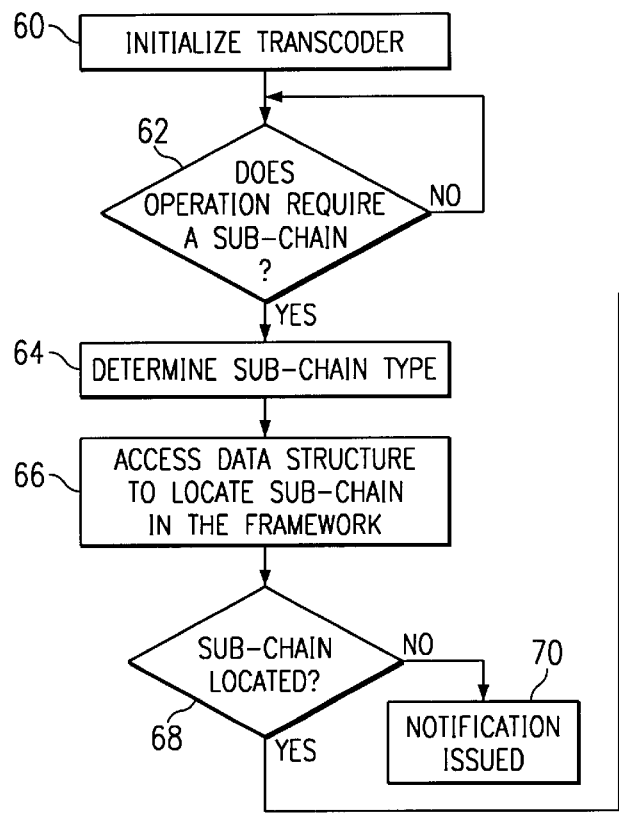
FIG. 6 is a flowchart of a managing routine of the transcoder.
Figure 6:
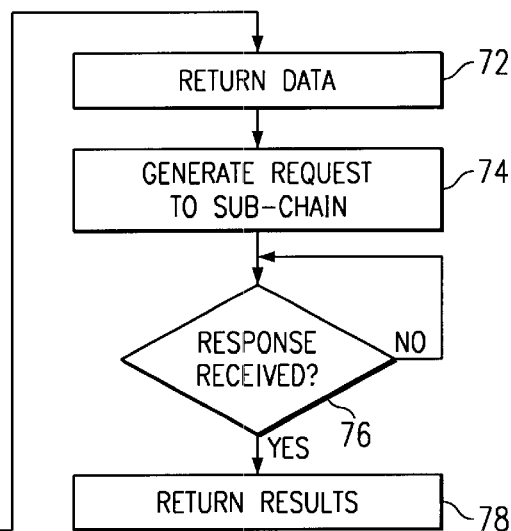

FIG. 4, transcoder T(2) was the owning transcoder for the sub-chain comprising transcoders T(a), T(b) and T(c). To this end, a given transcoder 50 as illustrated in FIG. 5 may include a manager routine 52, together with a transcoder sub-chain data structure 54. The transcoder 50 also includes a transcoder function 56, e.g., an editor, a generator, a monitor, an analyzer, or the like, as has been previously described. The sub-chain data structure 54 may be in the form of an array, a linked list, a flat list, or the like, that includes information identifying the location and characteristics of given transcoder sub-chains throughout the framework. Upon receipt of a given data request, the manager routine retrieves information from the data structure 54 and uses that information to initiate a request to the sub-chain. The flowchart of FIG. 6 illustrates the operation of the managing routine in more detail.

The routine begins at step 60 when the transcoder is initialized. The managing routine runs, for example, as a background process, continually monitoring the transcoder data stream. At step 62, a test is run to determine whether a given operation requires a transcoder sub-chain. If the output of the test is negative, the routine cycles. When the outcome of the test at step 62 is positive, the routine continues at step 64 to determine the type of sub-chain required for the operation. Following step 64, the routine continues at step 66 to access the sub-chain data structure to locate a sub-chain for the operation. A test is then run at step 68 to determine whether a sub-chain has been located. If not, an notification is provided at step 70. If an appropriate sub-chain is located, information about the sub-chain (e.g., its location, characteristics, and the like) is returned at step 72. At step 74, the managing routine generates a request to the sub-chain, passing whatever parameters are required. The routine then continues at step 76 to test whether a response has been received from the sub-chain. If not, the managing routine cycles and waits for the response. When the outcome of the test at step 76 is positive, the data stream returned from the sub-chain is passed back to the main transcoder function. This completes the processing.

The above-described polling model is not the only technique for enabling a transcoder for calling and using a transcoder sub-chain. In an alternate embodiment, a requesting transcoder registers its request and listens for specific responses. The sub-chains then post responses to the request. If desired, given sub-chains may bid for the right to respond to the request. Yet another alternative is to have a specific transcoder, as part of its execution, to invoke a transcoding sub-chain, or by having the transcoding frawework invoke the sub-chain as part of the selection of a next transcoder or sub-chain of transcoders.

As noted above, a given transcoder comprises software, i.e. a set of program instructions, executable in a processor. A representative processor is x86-, Pentium-, PowerPC®- or RISC-based, and that includes an associated operating system. A representative computing platform is an IBM S390 and AS400.

Figure 7:
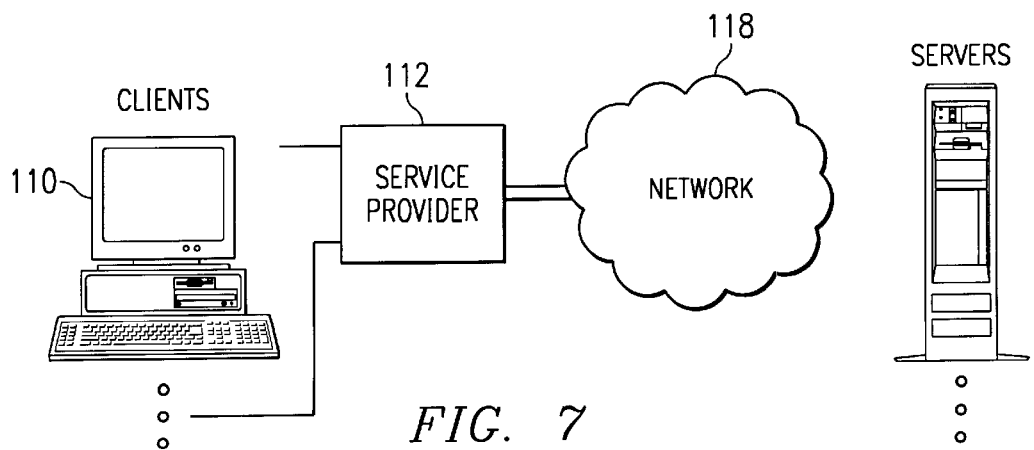
FIG. 7 illustrates a conventional client-server computing environment in which the transcoder framework may be implemented.

FIG. 7 illustrates a conventional client-server computing environment in which the transcoder framework may be implemented. A plurality of Internet client machines 110 are connectable to a computer network service provider 112 via a network such as a telephone network 114. The service provider 112 interfaces the client machines 110 to the remainder of the network 118, which may include a plurality of web content server machines 120. Network 118 typically includes other servers (not shown) for control of domain name resolution, routing and other control functions. A client machine typically includes a suite of known Internet tools. Various known Internet protocols are used for these services.

A given client machine and the server may communicate over the public Internet, an intranet, or any other computer network. If desired, given communications may take place over a secure connection. Thus, for example, a client may communication with the server using a network security protocol, such as Netscape's Secure Socket Layer (SSL) protocol or the like.

A representative client is a personal computer, notebook computer, Internet appliance or pervasive computing device (e.g., a PDA or palm computer) that is x86-, PowerPC®- or RISC-based. The client includes an operating system such as Microsoft Windows, Microsoft Windows CE or PalmOS. As noted above, the client includes a suite of Internet tools including a Web browser, such as Netscape Navigator or Microsoft Internet Explorer, that has a Java Virtual Machine (JVM) and support for application plug-ins or helper applications.

A representative web server is an IBM Netfinity server comprising a RISC-based processor 122, a UNIX-based operating system 124 and a web server program 126. OS 124 and web server program 126 are supported in system memory 123 (e.g., RAM). Of course, any convenient server platform (e.g., Apache, WebSphere, or the like) may be supported. The server may include an application programming interface 128 (API) that provides extensions to enable application developers to extend and/or customize the core functionality thereof through software programs including plug-ins, CGI programs, servlets, and the like. The present invention does not require any changes to server-side functionality, however, as will be seen.

As noted above, the invention may be implemented in software executable in a processor, namely, as a set of instructions (program code) in a code module resident in the random access memory of the computer. Until required by the computer, the set of instructions may be stored in another computer memory, for example, in a hard disk drive, or in a removable memory, or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

One of ordinary skill in the art also will appreciate that the sub-chaining technique of the present invention may be generalized for use with any stream or object-based intermediary application and not just a transcoder.

Having thus described our invention, what we claim as new and desire to secure by letters patent is set forth in the following claims.

What is claimed is:

1. A method for transcoding an input stream to a desired output format using a transcoder framework, comprising the steps of:

responsive to a given transcoder of the framework recognizing an external reference that it cannot transcode, calling a subseries of specialized transcoders to transcode the external reference; and having the subseries of specialized transcoders generate a transcoded external reference; and returning the transcoded external reference back to the given transcoder.

2. The method as described in claim 1 further including the step of having the given transcoder incorporate the transcoded external reference in an output of the given transcoder.

3. The method as described in claim 1 wherein the subseries of specialized transcoders transcodes the external reference into a format that the first transcoder can process.

4. The method as described in claim 1 wherein the given transcoder performs a given transcoding function selected from the group of functions consisting essentially of a generator, an editor, a monitor, and an analyzer.

5. The method as described in claim 1 wherein the subseries of specialized transcoders is reusable by any given transcoder in the transcoder framework.

6. The method as described in claim 1 further including the step of identifying the subseries of specialized transcoders responsive to a given transcoder of the framework recognizing an external reference that it cannot transcode.

7. The method as described in claim 6 wherein the step of identifying includes accessing a data structure associated with the given transcoder to identify the subseries of specialized transcoders.

8. The method as described in claim 7 wherein the data structure identifies one or more subseries of specialized transcoders that are accessible by transcoders in the transcoder framework.

9. A method for connecting a requesting process with a data source, comprising the steps of:

in response to a request from the requesting process, accessing the data source through a transcoding framework;

performing each of a set of transcoding steps in a respective one of a series of specialized transcoders;

responsive to a given transcoder recognizing an external reference that it cannot transcode, transcoding the external reference using a subseries of specialized transcoders;

providing a response to the request that includes a transcoded external reference generated by the subseries of specialized transcoders.

10. The method as described in claim 9 wherein the requesting process is a web application.

11. The method as described in claim 10 wherein the data source is hosted on a web server.

12. The method as described in claim 9 wherein the transcoding step includes the steps of:

having the subseries of specialized transcoders generate the transcoded external reference;

returning the transcoded external reference back to the given transcoder.

13. The method as described in claim 12 further including the step of having the given transcoder incorporate the transcoded external reference in an output of the given transcoder.

14. The method as described in claim 9 wherein the given transcoder performs a given transcoding function selected from the group of functions consisting essentially of a generator, an editor, a monitor, and an analyzer.

15. The method as described in claim 9 wherein the subseries of specialized transcoders is reusable by any given transcoder in the transcoder framework.

16. A transcoding framework, comprising:

a set of specialized transcoders for performing a set of transcoding steps; and at least one sub-chain of specialized transcoders responsive to a given specialized transcoder recognizing an external reference that it cannot transcode for generating a transcoded external reference.

17. The transcoding framework as described in claim 16 wherein the given transcoder performs a given transcoding function selected from the group of functions consisting essentially of a generator, an editor, a monitor, and an analyzer.

18. The transcoding framework as described in claim 16 wherein the subseries of specialized transcoders is reusable by any given transcoder in the transcoder framework.

19. The transcoding framework as described in claim 16 wherein the given transcoder includes a data structure identifying the sub-chain of specialized transcoders.

20. A transcoder, comprising:

a transcoding function;

a data structure for identifying one or more sub-chains of specialized transcoders; and a control routine responsive to recognition of an external reference that cannot be transcoded by the transcoding function (a) for locating a sub-chain of specialized transcoders in the data structure, (b) for calling the sub-chain of specialized transcoders, (c) for receiving a transcoded external reference provided by the sub-chain of specialized transcoders, and (d) for incorporating the transcoded external reference in an output of the transcoder.

21. A computer program product in a computer useable medium for use in a transcoder framework, comprising:

a transcoder; and means responsive to recognition of an external reference that cannot be transcoded by the transcoder (a) for calling a sub-chain of specialized transcoders, (b) for receiving a transcoded external reference provided by the sub-chain of specialized transcoders, and (c) for incorporating the transcoded external reference in an output of the transcoder.

22. The computer program product as described in claim 21 wherein the transcoder performs a given transcoding function selected from the group of functions consisting essentially of a generator, an editor, a monitor, and an analyzer.

23. A method for processing an input stream to a desired output format using an intermediary framework, comprising the steps of:

responsive to a given occurrence at a given stream intermediary of the framework, calling a subseries of specialized intermediaries to take a given action required by the given stream intermediary; and having the subseries of specialized intermediaries generate given data; and returning the given data back to the given stream intermediary for further processing.

24. The method as described in claim 23 wherein the given stream intermediary is a transcoder.

* * * * *